May 3, 1960 F. WOHLMAN 2,935,097

ELONGATED OBJECT STRAIGHTENING APPARATUS

Filed May 13, 1955 2 Sheets-Sheet 1

INVENTOR.
FRED WOHLMAN
BY
Henry Heyman
ATTORNEY.

May 3, 1960 F. WOHLMAN 2,935,097

ELONGATED OBJECT STRAIGHTENING APPARATUS

Filed May 13, 1955 2 Sheets-Sheet 2

INVENTOR.

FRED WOHLMAN

BY

Henry Heyman

ATTORNEY.

United States Patent Office 2,935,097

Patented May 3, 1960

2,935,097

ELONGATED OBJECT STRAIGHTENING APPARATUS

Fred Wohlman, Inglewood, Calif., assignor to Hughes Aircraft Company, Culver City, Calif., a corporation of Delaware Application May 13, 1955, Serial No. 508,101

5 Claims. (Cl. 140—147)

The present invention relates to an apparatus for straightening elongated objects, and relates more particularly to such an apparatus for straightening wire or other cylindrical objects as may be utilized for leads for semiconductor translating devices, for example.

In the manufacture of semiconductor translating devices, in order that the end results and functional characteristics of the devices may be maintained at a high value commensurate with the necessities of mass production techniques, one important necessity in such manufacture of these devices such, as for example, transistors of various types, diodes or rectifiers, photocell devices and the like, is that the various components utilized in the devices be accurately, efficiently and rapidly disposed or secured in relation to each other. In order that such relationships may be maintained, it is extremely necessary that the various components be either held in jigs or other types of machinery. To facilitate efficient holding of the various components, such as the wire leads thereof, it is important, not only from an efficient and rapid production standpoint, but also relative to alignment, placement and disposition of these leads, that the leads be absolutely straight at all stages of the manufacturing process. In the course of cutting, handling, transporting and attaching other components to the leads, invariably such leads become slightly bent, curved or otherwise undesirably deformed, and efficient means must therefore be provided to accomplish the straightening thereof.

In addition to the above problems encountered in the manufacture of semiconductor translating devices, consideration must also be given to the relatively small sizes of the components employed in such devices. Due to the inherent minute configurations of these components, it has become important that the mechanism or apparatus employed in straightening the wire leads, which may be in the nature of .020" to .030" in diameter, be of such a nature whereby accurately, carefully and positively to handle and straighten these leads.

It is, accordingly, one important object of the present invention to provide a novel apparatus for straightening elongated objects.

It is another important object of the present invention to provide an apparatus for straightening wire members or the like that, is simple in construction, reliable and effective in operation and which may be utilized by unskilled operators.

A further important object of the present invention is to provide an apparatus for straightening components of semiconductor translating devices wherein means are provided for receiving, transporting and delivering such components into, between and from a pair of relatively moving surfaces arranged in close approximation, one to the other.

Still another important object of the present invention is to provide a device for straightening wire leads, forming portions of semiconductor translating devices, wherein means are provided automatically to separate and space one lead from another in passage through the present apparatus and whereby thereafter to deliver such devices to a point of access for the operator.

A still further object of the present invention is to provide a wire straightener incorporating a pressure block arranged in cooperation with a rotor and wherein the dimensional relationships between said block and said rotor are such as to permit easy disposition of the leads therebetween and adequate removal therefrom.

Other and further important objects of the present invention will become apparent from the disclosures in the following detailed specification, appended claims and accompanying drawings, wherein:

Figure 1:
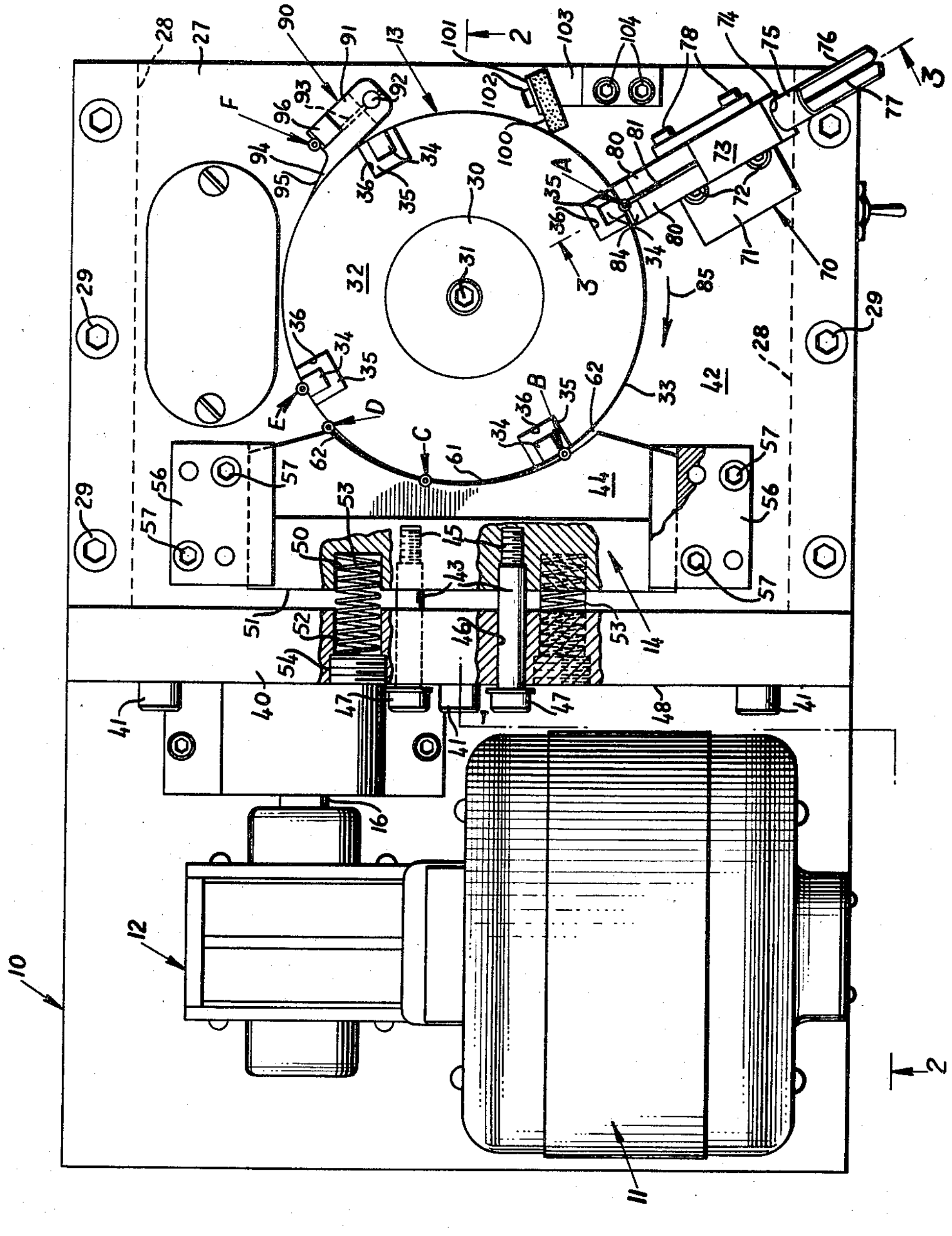
Figure 1 is a top plan view, partially in section, showing the straightening apparatus of the present invention.
Figures 2, 3, 4:
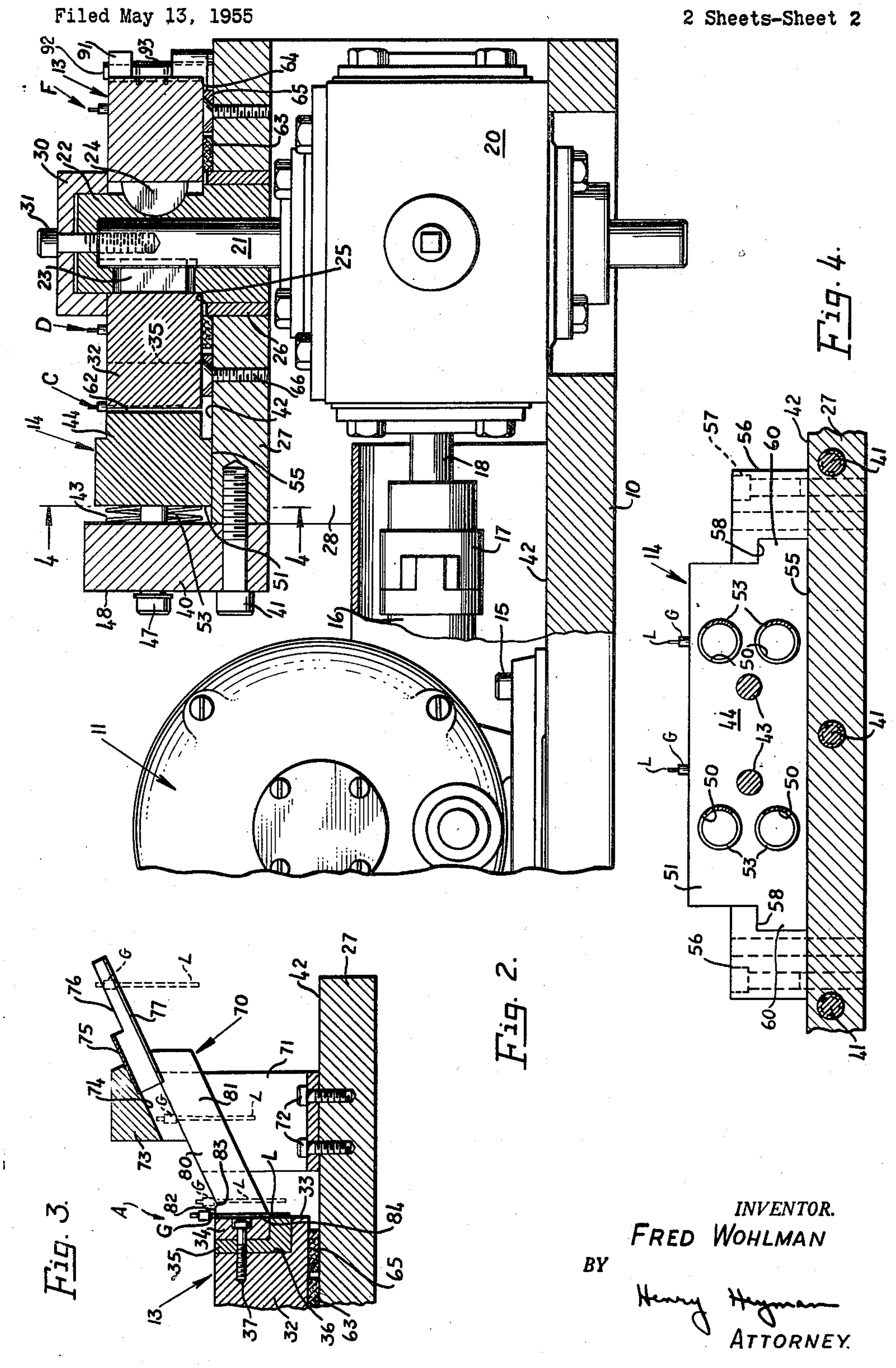
Fig. 2 is a transverse sectional view through portions of the apparatus, as taken substantially as indicated by line 2—2, Fig. 1.
Fig. 3 is a fragmentary sectional view through the chute delivery mechanism, as taken substantially as indicated by line 3—3, Fig. 1.
Fig. 4 is a fragmentary sectional view through a portion of a pressure applying mechanism for the pressure block, as taken substantially as indicated by line 4—4, Fig. 2.

With reference primarily to Figs. 1 and 2 of the drawings, the straightening apparatus of the present invention comprises generally a base member 10 having mounted thereon a driving motor 11 which operates through a suitable transmission 12 to drive a rotor 13. A pressure block, indicated generally at 14, is disposed in cooperative relationship to the rotor 13.

The driving means 11 may be of any particular type, there being shown herein an electrical motor with the gear box or transmission 12 being designed particularly to reduce the speed of the motor 11. The motor 11 is secured to the base 10 by means of suitable screws 15, with the transmission 12 being mounted on one end of the motor. A driving shaft 16 extends from the transmission 12, through a suitable union arrangement 17 and a shaft 18, to a second speed reducing gear box 20. The gear box 20 is mounted on the base 10 and has extending therefrom an output shaft 21. The output shaft 21 has disposed thereon a sleeve 22 that is keyed to this shaft by means of a key 23. The rotor 13 is, in turn, secured to the sleeve 22 by means of a second key 24. The rotor 13 is adapted to rest upon a shoulder 25 formed on the sleeve 22, with the outer portion of the sleeve 22 being journalled in a suitable sleeve bearing 26 carried by a platform 27. The platform 27 is, in turn, secured to the base 10 by means of side members 28 that are secured in position by screws 29. As shown, the rotor 13, sleeve 22 and shaft 21 are secured together, with the rotor being urged into engagement with the shoulder 25, by means of an inverted cup-shaped cap 30 that is retained in position about an upper end of the sleeve 22 by means of a screw 31 which extends through the cap and the outer end of the sleeve 22 and threadably engages the upper end of the output shaft 21.

The rotor 13 includes an annular body portion 32 having a relatively wide, axially extending cylindrical outer peripheral surface 33. A plurality of permanent magnets 34 are disposed in magnet retaining members 35 which are, in turn, disposed in radially extending slots 36 in the periphery 33 of the rotor. The outer surfaces of the magnets 34 and retainers 35 are coextensive with the surface 33 of the rotor body 32, whereby to present a smooth continuous exterior surface for the rotor. The magnets 34 and the retainers 35 are each retained in position by means of screws 37, Fig. 3.

One end of the platform 27 is fitted with a vertically extending backing member 40 that is secured to and disposed from an upper surface of the platform 27. The backing member 40 is secured in position by means of a plurality of bolts 41 which threadably engage one edge of the platform. The pressure block 14 is slidably disposed upon an upper surface 42 of the platform 27 and secured against lateral movement by means of a pair of guide studs 43 which threadably engage the body 44 of the guide block, as at 45. The studs 43 extend through bores 46 in the backing member 40 and are slidably disposed therein, heads 47 formed on the outer ends thereof serving, by engagement with an outer surface 48 of the backing member 40, to limit movement of the pressure block 14 in a direction away from the backing member 40.

The body 44 of the pressure block 14 is provided with vertically and horizontally spaced recesses 50 in a rearward surface 51 thereof, while the backing member 40 is provided with bores 52 disposed in alignment with the recess 50. A plurality of compression springs 53 are disposed in the recess 50 and bores 52, and retained therein by means of threaded plugs 54 that are disposed in the recess 52 from the surface 48 of the backing member 40. Thus, the pressure block 14 is urged or biased in a direction away from the backing member 40 by means of the plurality of compression springs 53, with movement in this direction being limited by engagement of the heads 47 of the studs 43 with the rearward surface 48 of the backing member 40. A lower surface 55 of the block body 44 is retained in slidable contact with the surface 42 of the platform 47 by means of guide members 56 that are mounted on the platform 27 and secured thereto by means of screws 57. The guide members 56 have inwardly and downwardly directed ways 58 that are adapted to engage outwardly extending shoulders 60 formed on the body 44 of the pressure block 14.

The surface of the body 44 of the pressure block 14 disposed adjacent the outer periphery 33 of the rotor 13 has a surface 61 of semicircular configuration. With reference to Fig. 2, it is to be noted that the radius of curvature of the surface 61 of the pressure block 14 is larger than the radius of the rotor 13. Thus with the placement of the center of the rotor 13 on a radius of curvature of the pressure block 14 so that the rotor is adjacent the surface 61 thereof, the space 62 between the rotor 13 and the pressure block 14 continually increases away from the point whereat the rotor is nearest the pressure block. The rotor 13 is symmetrically positioned with respect to the arcuate surface 61 of the pressure block 14 by locating the center of axis of the rotor on that radius of the arc defining the curved surface 61 which bisects this arc. This radius may be defined and referred to as the central radius of the curved surface 61. It will be understood that the point of nearest approach between the periphery of the rotor 13 and the pressure block 14 is also located on the central radius of the curved surface 61. The space 62 between the surface 61 and the surface 33 of the rotor 13 is thus of minimal width at this point of nearest approach and of increasingly greater width proceeding away from this point, this arrangement being for a purpose to be hereinafter more fully described.

In order that the body 32 of the rotor 13 may rotate freely in the sleeve bearing 26 and upon the upper surface 42 of the platform 27, an annular oil retainer 63 is positioned about the upper portion of the sleeve bearing 26 and intermediate a lower surface 64 of the rotor body 32 and the surface 42 of the platform 27. The oil retainer 63 may be of any suitable material such as felt, or the like, with the outer peripheral portion thereof being loosely confined within a ring 65 that is disposed in contact with the surface 42 and secured to the platform 27 by means of a plurality of screws 66.

In order that objects to be straightened may automatically be delivered to the device, a chute, indicated generally at 70, Figs. 1 and 3, is provided. The chute 70 has a supporting bracket 71 that is secured to the upper surface 42 of the platform 27 by means of screws 72. The upper portion of the bracket 71 is fitted with a transversely extending block 73 having an angularly disposed bore 74 therein. One end of the bore 74 is fitted with a tube 75, the upper portion of which is cut away as at 76, with the lower portion thereof being provided with an elongated slot 77. The block 73 is secured to the bracket 71 by means of suitable screws 78 and is further provided with a pair of integral, elongated guide members 80, there being a channel 81 formed therebetween. The lower ends of the guide members 80 have upwardly extending portions 82 thereon, thus defining a transverse recess 83. Lower inner ends 84 of the guide members 80 are arranged in close approximation to the outer peripheral surface 33 of the rotor 13.

Thus, an object to be straightened, such as, for example, a portion of a semiconductor translating device comprising a lead L, having a glass bead G fused thereto, may manually be positioned within the cutaway portion 76 of the tube 75 and within the slot 77 formed in the lower side thereof. The elongated object will thereafter gravitate, as indicated by the dotted lines in Fig. 3, until the bead G rests within the recess 87. Upon movement of one of the permanent magnets 34 into position adjacent to the channel 81, the lead and glass bead combination object will be drawn magnetically from the channel 81 and onto the outer peripheral surface 33 of the rotor 13, within the area of one of the permanent magnets 34. This position of the elongated object is indicated at A in Fig. 1. It is to be noted that the upper edges of the raised portions 82 of the guide members 80 are in radial coextensive alignment with the upper surface of the rotor body 32, in order that the glass bead G may be disposed in a position to rest upon the upper surface of the rotor. It is to be noted that the upper surface of the body 44 of the pressure block 14 is also in radial coextensive alignment with the upper surface of the rotor body 32, in order that the bead G may be transported without damage to this bead and in a manner permitting straightening of the lead L to a point closely adjacent to the bead.

Upon continued rotation of the rotor 13 in the direction of the arrow 85, Fig. 1, the elongated object will be moved to a position within one end of the shaped space 62 between the semicircular surface 61 of the pressure block body 44 and the outer peripheral surface 33 of the rotor body 32. This position is indicated at B in Fig. 1. As the rotor continues to rotate, the lead L of the elongated object will be carried into decreasingly narrower portions of the spaced shape 62 as the point of nearest approach between a surface 33 of the rotor 13 and the curved surface 61 of the pressure block 14 is approached. Thus the lead L will be rolled between the surface 33 of the rotor and the semicircular surface 61 of the pressure block to the position shown at C, there being controlled pressure maintained on the lead by means of the compression springs 53 biasing the pressure block toward the rotor. The differential movement between the surfaces 33 and 61 will move the elongated object away from the point of nearest approach between the surface 33 and the surface 61 and hence into increasingly wider portions of the spaced shape 62 and along the surfaces to a position indicated at D in Fig. 1, at which point the object will merely reside within the other end of the shaped space 62 and rest upon the upper surfaces of the pressure block body 44 and rotor body 32 respectively. The object will remain in this position until the next permanent magnet 34 is moved into engagement therewith, whereby to extract the object from the space 62 and carry this object further with the rotor 13, as indicated at E in Fig. 1. This particular construction enables insertion of the lead L between the adjacent surfaces of the pressure block and the rotor and removal therefrom in a controlled manner, thus preventing inadvertent and undesirable bending, scratching or dropping of the objects either before or after straightening thereof.

As further shown in Fig. 1, a pick-off device, indicated generally at 90, is provided for removing the straightened objects from the peripheral surface 33 of the rotor body 32. The pick-off device 90 includes a vertically disposed block 91 that is pivotally arranged on a shaft 92. The shaft 92 is secured to the platform 27, there being a spring 93 disposed through suitable laterally disposed openings in the shaft 92, for urging the block 91 in a direction toward the periphery of the rotor. The block 91 has a wedge shaped end portion 94 formed thereon, the outer end of which is relatively sharp and adapted for engagement with the periphery 33 of the rotor body 32. As the elongated objects are moved from the position E further with the rotor 13, the sharpened end of the wedge portion 94 of the block 91 will engage the leads L, thus removing the objects from the periphery of the rotor. The one permanent magnet 34, supporting the particular object to be removed, serves to move the lead L along a bevelled surface 95 of the wedge portion 94, with the object thereafter being disposed upon a permanent magnet 96 carried by the body 91 of the pick-off device. An operator may thereafter remove the straightened elongated objects from the position shown at F in Fig. 1.

In order that the outer peripheral surface 33 of the rotor body 32 may be kept clean, a flexible wiper 100 is disposed in contact therewith. The wiper 100 may be of any suitable material such as felt, for example, and is secured, by means of a plate 101 and screws 102, to a bracket 103 that is, in turn, mounted on the upper surface 42 of the platform 27 and adjustably secured thereto by means of screws 104.

Thus, it may be seen that elongated objects, such as the lead and bead assembly component of a semiconductor translating device, may be disposed within the chute arrangement 70, thereafter to be picked up by the spaced permanent magnets 34 carried by the rotor 13 and disposed between the surfaces 33 and 61 of the rotor and pressure block respectively. Thereafter, the objects are delivered to a position on the pick-off apparatus 90 where an operator may remove the completely straightened components. The particular arrangement of the various parts of the present apparatus enable gentle handling of these relatively delicate objects, so as to prevent any breakage thereof or undesirable additional deformation following the straightening operation. The objects thus delivered from the present apparatus may thereafter be conducted through further operations in the manufacture of semiconductor translating devices, with accurate placement of further components being enabled by reason of positive alignment occasioned by the present straightened situation of the leads L. It is further to be noted that interference between successive elongated objects is avoided by automatic spacing thereof about the periphery of the rotor. In this regard, with reference again to Fig. 1, only a single object is permitted to be delivered to the permanent magnets 34 from the chute 70, due to a differential spacing of the guide members 80 relative to the periphery 33 of the rotor body 32. The space between the inner end 84 of one of the guide members 80 is approximately equal to, or slightly larger than, the diameter of the leads L, for this purpose.

Having thus described the invention and the present embodiment thereof, it is desired to emphasize the fact that many modifications may be resorted to in a manner limited only by a just interpretation of the following claims.

What is claimed is:

1. An apparatus for straightening elongated objects comprising: a rotor; means for driving said rotor; means for delivering said objects in a vertical attitude to a peripheral surface of said rotor; spaced permanent magnet means carried by said rotor for maintaining said objects on said surface thereof; a pressure block disposed adjacent said rotor and mounted for movement on a radius of said rotor; spring means for biasing said pressure block toward said rotor; a semicircular surface on said pressure block, said semicircular surface having a radius described from a center spaced in a direction away from said block, from the center of said rotor and lying on said radius of said rotor, the radius of curvature of said semicircular surface being greater than the radius of said rotor, said objects being adapted for movement by said rotor between said peripheral surface thereof and said semicircular surface of said block; and magnetic means for automatically removing said objects from the surface of said spaced permanent magnet means.

2. An apparatus for straightening elongated objects comprising, in combination: a rotor having a relatively wide peripheral surface; means for driving said rotor at a continuous speed; a chute, one end of said chute being disposed in close approximation to said peripheral surface of said rotor; a plurality of spaced permanent magnets carried by said rotor and disposed about the periphery thereof, said elongated object being adapted for manual placement in said chute and gravitational travel therealong for pickup by said magnets; a pressure block; a semicircular surface on said block, said semicircular surface being disposed in close approximation to said surface of said rotor whereby to define a shaped space therebetween, said objects being adapted for movement by said rotor into said space; spring means for biasing said block toward said rotor; means for removing said objects from the surfaces of said spaced permanent magnets; and magnetic means for thereafter receiving and retaining said objects.

3. An apparatus for straightening elongated objects comprising, in combination: a rotor having a relatively wide peripheral surface; means for driving said rotor at a continuous speed; a chute, one end of said chute being disposed in close approximation to said peripheral surface of said rotor; a plurality of spaced permanent magnets carried by said rotor and disposed about the periphery thereof, said elongated objects being adapted for manual placement in said chute and gravitational travel therealong for pickup by said magnets; a pressure block; a semicircular surface on said block, said semicircular surface being disposed in close approximation to said surface of said rotor, radius of curvature of said semicircular surface being greater than the radius of said rotor whereby to define a shaped space therebetween, said objects being adapted for movement by said rotor into said space thereafter to be rolled between said surfaces; spring means for biasing said block toward said rotor; guide means for said block, said guide means limiting movement of said block in directions only toward and from said rotor; means for removing said objects from the surfaces of said spaced permanent magnets; and magnetic means for thereafter receiving and retaining said objects.

4. An apparatus for straightening elongated objects comprising, in combination: a rotor having a relatively wide peripheral surface; means for supporting and driving said rotor at a continuous speed; a chute, one end of said chute being disposed in close approximation to said peripheral surface of said rotor; a plurality of spaced permanent magnets carried by said rotor and disposed about the periphery thereof, said elongated objects being adapted for manual placement in said chute and gravitational travel therealong for individual pickup by said magnets; a pressure block; a semicircular surface on said block, said semicircular surface being disposed in close approximation to said surface of said rotor, the radius of curvature of said semicircular surface being greater than the radius of said rotor whereby to define a shaped space therebetween, said objects being adapted for movement by said rotor into said space; spring means for biasing said block toward said rotor; means for removing said objects from the surfaces of said spaced permanent magnets, said magnets being adapted to move said objects along said removing means; and magnetic means for thereafter receiving and retaining said objects.

5. An apparatus for straightening elongated objects comprising, in combination: a rotor having a relatively wide peripheral surface; means for supporting and driving said rotor at a continuous speed; a chute, one end of said chute being disposed in close approximation to said peripheral surface of said rotor; a plurality of spaced permanent magnets carried by said rotor and disposed about the periphery thereof, said elongated objects being adapted for manual placement in said chute and gravitational travel therealong for individual pickup by said magnets; a pressure block; a semicircular surface on said block, said semicircular surface being disposed in close approximation to said surface of said rotor, the radius of curvature of said semicircular surface being greater than the radius of said rotor whereby to define a shaped space therebetween, said objects being adapted for movement by said rotor into said space thereafter to be rolled between said surfaces; spring means for biasing said block toward said rotor; guide means for said block, said guide means limiting movement of said block in directions only toward and from said rotor; means for removing said objects from the surface of said spaced permanent magnet means, said magnets being adapted to move said objects along said removing means; and magnetic means for thereafter receiving and retaining said objects.

References Cited in the file of this patent

UNITED STATES PATENTS

| | | |
|---|---|---|
| 191,085 | Thompson et al. | May 22, 1877 |
| 994,941 | Lewis | June 13, 1911 |
| 1,109,662 | Cavanagh | Sept. 8, 1914 |
| 1,965,489 | Coates | July 3, 1934 |
| 2,309,126 | Lundius | Jan. 26, 1943 |
| 2,334,004 | Herzog | Nov. 9, 1943 |
| 2,448,941 | Wickwire | Sept. 7, 1948 |
| 2,622,654 | Frank | Dec. 23, 1952 |
| 2,771,206 | Daniels et al. | Nov. 20, 1956 |